United States Patent
Kim et al.

(10) Patent No.: US 9,667,296 B2
(45) Date of Patent: May 30, 2017

(54) MOBILE TERMINAL HAVING AN ANTENNA

(71) Applicant: LG ELECTRONICS INC., Seoul (KR)

(72) Inventors: Changil Kim, Seoul (KR); Dongjin Kim, Seoul (KR); Yeomin Youn, Seoul (KR); Hyeongsik Yoon, Seoul (KR); Jaegon Lee, Seoul (KR); Chisang You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/443,996

(22) PCT Filed: Dec. 16, 2013

(86) PCT No.: PCT/KR2013/011656
§ 371 (c)(1),
(2) Date: May 19, 2015

(87) PCT Pub. No.: WO2015/002359
PCT Pub. Date: Jan. 8, 2015

(65) Prior Publication Data
US 2016/0182112 A1 Jun. 23, 2016

(30) Foreign Application Priority Data

Jul. 5, 2013 (KR) .................. 10-2013-0078880
Jul. 5, 2013 (KR) .................. 10-2013-0078881

(51) Int. Cl.
*H04B 1/38* (2015.01)
*H04M 1/00* (2006.01)
(Continued)

(52) U.S. Cl.
CPC .......... *H04B 1/3888* (2013.01); *H01Q 1/243* (2013.01); *H01Q 1/42* (2013.01); *H01Q 1/44* (2013.01);
(Continued)

(58) Field of Classification Search
CPC .... H04B 1/3888; H04B 15/005; H01Q 1/243; H01Q 1/42; H01Q 1/44; H04M 1/0274
See application file for complete search history.

(56) References Cited

U.S. PATENT DOCUMENTS 7,405,702 B2 * 7/2008 Annamaa ............. H01Q 1/3291
343/702
2009/0085822 A1 4/2009 Yu et al.
(Continued)

FOREIGN PATENT DOCUMENTS

CN 101944921 1/2011
CN 102593578 7/2012
(Continued)

OTHER PUBLICATIONS

PCT International Application No. PCT/KR2013/011656, Written Opinion of the International Searching Authority dated Mar. 21, 2014, 10 pages.
(Continued)

*Primary Examiner* — Nguyen Vo
(74) *Attorney, Agent, or Firm* — Lee, Hong, Degerman, Kang & Waimey

(57) ABSTRACT

A mobile terminal, comprises: a case including a conductive metal part; a main board mounted inside the case and having a power supply part and a ground surface; a first antenna radiator disposed so as to be spaced from the power supply part to the first antenna radiator; a power supply line for electrically connecting the power supply part to the first antenna radiator and ground line for electrically connecting
(Continued)

the ground surface to the metal part and the first antenna radiator, thereby preventing a decrease in the performance of an antenna since the formation of an electromagnetic field between the case of a metallic material and the main board can be minimized even if the metallic material is used for the case.

15 Claims, 12 Drawing Sheets

(51) Int. Cl.
    *H04B 1/3888* (2015.01)
    *H04B 15/00* (2006.01)
    *H04M 1/02* (2006.01)
    *H01Q 1/24* (2006.01)
    *H01Q 1/42* (2006.01)
    *H01Q 1/44* (2006.01)

(52) U.S. Cl.
    CPC ........ *H04B 15/005* (2013.01); *H04M 1/0274* (2013.01)

(56) References Cited

U.S. PATENT DOCUMENTS

| | | |
|---|---|---|
| 2009/0153407 A1 | 6/2009 | Zhang et al. |
| 2010/0090921 A1 | 4/2010 | Kim et al. |
| 2012/0268328 A1* | 10/2012 | Kim ........................ H01Q 1/243 343/702 |
| 2012/0329526 A1* | 12/2012 | Song ...................... G06F 1/1643 455/566 |
| 2013/0207852 A1* | 8/2013 | Nakano ................ H01Q 1/2225 343/702 |
| 2014/0139393 A1* | 5/2014 | Yoon ...................... H01Q 1/246 343/845 |

FOREIGN PATENT DOCUMENTS

| | | |
|---|---|---|
| EP | 2493009 | 8/2012 |
| JP | 11-355022 | 12/1999 |
| KR | 10-2008-0037973 | 5/2008 |
| KR | 10-2009-0037674 | 4/2009 |
| KR | 10-2010-0041117 | 4/2010 |
| KR | 10-2011-0117892 | 10/2011 |

OTHER PUBLICATIONS

The State Intellectual Property Office of the People's Republic of China Application No. 201380060645.8, Office Action dated Jul. 14, 2016, 21 pages.

European Patent Office Application No. 13888701.3, Search Report dated Jul. 21, 2016, 9 pages.

\* cited by examiner

High band

Low band

MOBILE TERMINAL HAVING AN ANTENNA

CROSS-REFERENCE TO RELATED APPLICATIONS

This application is the National Stage filing under 35 U.S.C. 371 of International Application No. PCT/KR2013/011656, filed on Dec. 16, 2013, which claims the benefit of earlier filing date and right of priority to Korean Patent Application No. 10-2013-0078880, filed on Jul. 5, 2013 and 10-2013-0078881, filed on Jul. 5, 2013, the contents of which are all hereby incorporated by reference herein in their entirety.

FIELD

Embodiments of the present invention relate to a mobile terminal to which a metallic case may be applied, without decreasing performance of an antenna.

BACKGROUND

Generally, terminals can be classified into mobile terminals and stationary terminals. In addition, the mobile terminals can be further classified into handheld terminals and vehicle mount terminals.

Further, a mobile terminal can perform various functions such as data and voice communications, capturing images and video via a camera, recording audio, playing music files and outputting music via a speaker system, and displaying images and video on a display.

A rear case of such a mobile terminal is generally formed of a dielectric substance. However, manufacturing of a mobile terminal having a metallic case coupled thereto has been attempted according to recent requirement of external appearance improvement.

A battery cover formed of a metallic material could interfere in radio radiation of an antenna. Accordingly, when the metallic battery cover is used, there are increasing needs for an antenna which may radiate proper radio radiation.

DETAILED DESCRIPTION OF THE INVENTION

Technical Problem

To overcome the disadvantages, an object of the present invention is to provide a mobile terminal which may prevent decrease of transmission/reception performance of an antenna even when a metallic material is used for a case.

Technical Solution

To achieve these objects and other advantages and in accordance with the purpose of the embodiments, as embodied and broadly described herein, a mobile terminal includes a case including a conductive metal part; a main board mounted inside the case and having a power supply part and a ground surface; a first antenna radiator disposed so as to be spaced from the power supply part to the first antenna radiator; and a ground line for electrically connecting the ground surface to the metal part and the first antenna radiator.

The case may include a body case in which the main board is loaded; and a backside cover detachably coupled to a rear surface of the body case and comprising the metal part.

The ground line may be a flexible circuit board comprising a conductive pattern having one portion connected to the first antenna radiator and the other portion connected to the metal part and the power supply part.

The mobile terminal may further include a screw connected to the first antenna radiator via the flexible circuit board and the body case, wherein the portion of the flexible circuit board is provided in an outer surface of the body case.

The mobile terminal may further include a connection terminal provided in the other portion of the flexible circuit board and connected to the conductive pattern, the connection terminal elastically flexible to be connected to the metal part when coupled to the body case.

The power supply part may include a C-clip connected to the other portion of the flexible circuit board.

The first antenna radiator may be exposed to an outer surface of the case to form a predetermined portion of the case.

The ground line and the power supply line may be arranged aside to a predetermined portion with respect to a central portion of the first antenna radiator, and connected to the first antenna radiator.

The first antenna radiator may receive a first frequency signal and a second frequency signal, and a ratio of a distance to one end of the first antenna radiator to a distance to the other end of the first antenna radiator from the connected portion between the ground line and the power supply line may be corresponding to a ratio of the first frequency to the second frequency.

The mobile terminal may further include a second antenna radiator provided in a predetermined portion of a second lateral surface not adjacent to a first lateral surface, wherein the first antenna radiator is provided in the first lateral surface of four lateral surfaces formed in the mobile terminal, and power supply and ground of the second antenna radiator is arranged aside to a predetermined portion in the same direction with the ground line and the power supply line.

Each of the ground line and the power supply line may have a bent portion, and the first antenna radiator may be formed in a linear-bar shape.

The first antenna radiator may be provided in an upper or lower end of the mobile terminal. The first antenna radiator may be formed in a ⊏ shape extended from the upper end of the mobile terminal in a right and left direction.

A distance between an end of the first antenna radiator and the metal part may be 1 mm or more.

The mobile terminal may further include an antenna radiation pattern provided between the metal part and the first antenna radiator and formed in a surface of the case, with electrically connected to the metal part.

The mobile terminal may further include a middle frame provided inside the case, in which the main board and electronic components are loaded, the middle frame comprising a metal plate and an injection mold, wherein the first antenna radiator is coupled to one end of the middle frame, spaced apart a preset distance from the metal plate.

The metal part may be electrically connected to the metal plate.

In another aspect of the present disclosure, a mobile terminal includes a case; a main board mounted inside the case and having a power supply part; a ground surface mounted inside the case or a surface of the case; a loop-type first antenna radiator provided in one end of the case, spaced apart a preset distance from the ground surface and the power supply part; a power supply line extended from the power supply part to supply an electric power to the first antenna radiator; and a by-pass line for electrically connecting the ground surface to the first antenna radiator.

The ground line may include a ground portion connected to the ground surface; a radiation contact portion connected to the first antenna radiator; and a by-pass line provided between the ground portion and the radiator contact portion, spaced apart a preset distance from the first antenna radiator.

The mobile terminal may further include a middle frame provided inside the case, in which the main board and electronic components are loaded, the middle frame comprising a metal plate and an injection mold, wherein the ground surface is the metal plate.

The middle frame may include an injection mold coupled to an outer surface of the metal plate, and a predetermined portion of the first antenna radiator may be coupled to the injection mold, spaced part a preset distance from the metal plate.

The case comprises a metal part, and the ground surface may include the metal plate and the metal part, and the ground line is connected to the metal plate and the metal part.

The case may include a body case in which the main board is mounted; and a backside cover detachably coupled to a rear surface of the body case and having the metal part, and the ground line and the metal part may be connected to each other by a connection terminal detachably.

The case may include a metal part, and the first antenna radiator may be grounded to the metal part.

The first antenna radiator may be exposed outside to form a predetermined portion of the case.

The power supply line may include a power supply portion connected to the power supply part; and a capacitor spaced apart a preset distance from the antennal radiator.

Advantageous Effects

According to at least one of the embodiments of the present disclosure, the electromagnetic field formed between the metallic case and the main board 185 may be minimized even when a metallic material is sued for the case. Accordingly, the decrease of the antenna performance may be prevented.

Furthermore, the decrease of signal transmission and reception efficiency in the low frequency bandwidth may be prevented and the distance between the antenna radiator and the metal plate of the middle frame may be reduced. Accordingly, the size of the bezel may be reduced.

Still further, the case having the metal part may be used. When the first antenna radiator is directly grounded to the metal part of the case, the distance between the first antenna radiator 250 and the metal part of the case may be reduced. Accordingly, a degree of design freedom in using the metallic material for the case may be enhanced.

Still further, even in case the metallic material is decoupled in case of a battery cover having the metal case detachable there from, the performance of the antenna may be maintained.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF SPECIFIC EMBODIMENTS

Figure 1:
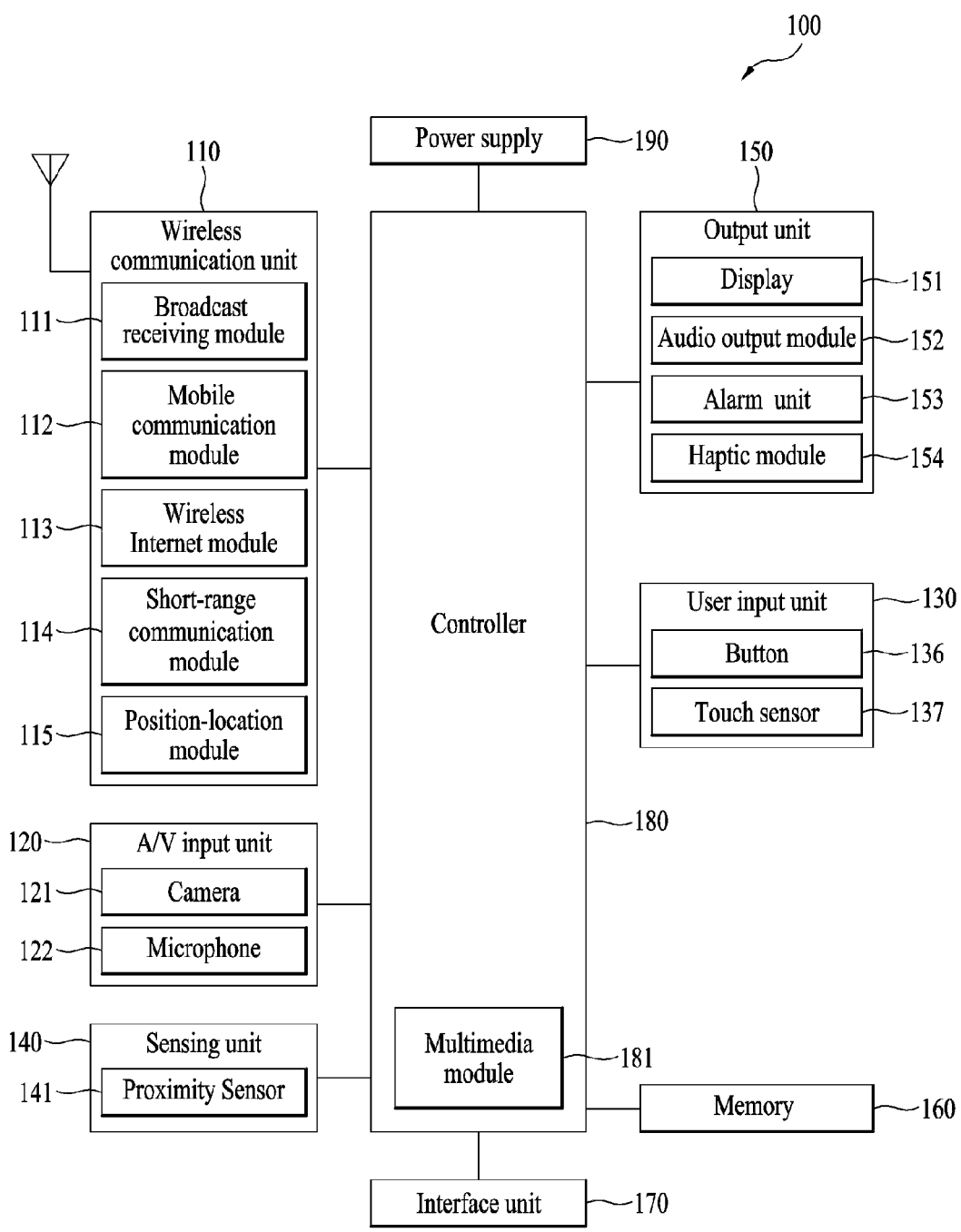
FIG. 1 is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

In general, a suffix such as "module" and "unit" may be used to refer to elements or components. Use of such a suffix herein is merely intended to facilitate description of the specification, and the suffix itself is not intended to give any special meaning or function.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal 100 in accordance with an embodiment as broadly described herein. The mobile terminal 100 may include a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Gobal System for Mobile communications), CDMA (Code Division Multiple Access), WCDMA (Wideband CDMA) and so on. Such wireless signals may represent audio, video, and data according to text/multimedia message transmission and reception, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 1, the audio/video (A/V) input unit 120 may be configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151 of the output unit 150.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 may include assorted noise removing algorithms to remove noise generated in the course of receiving the external audio signal.

The user input unit 130 may generate input data responsive to user manipulation of an associated input device or devices. Examples of such devices include a button 136 provided to front/rear/lateral side of the mobile terminal 100 and a touch sensor (pressure sensitive touch/capacitive touch) 137 and may further include a key pad, a dome switch, a jog wheel, a jog switch and the like.

The sensing unit 140 may provide sensing signals for controlling operations of the mobile terminal 100 using status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such a sensing unit 140 may include, a gyro sensor, an acceleration sensor, a geomagnetic sensor and the like.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 may include a proximity sensor 141.

The output unit 150 may generate outputs relevant to the senses of sight, hearing, touch and the like. The output unit 150 includes the display 151, an audio output module 152, an alarm unit 153, and a haptic module 154 and the like.

The display 151 may be implemented to visually display (output) information associated with the mobile terminal 100. For instance, if the mobile terminal is operating in a phone call mode, the display may provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittable type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 may be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor may be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
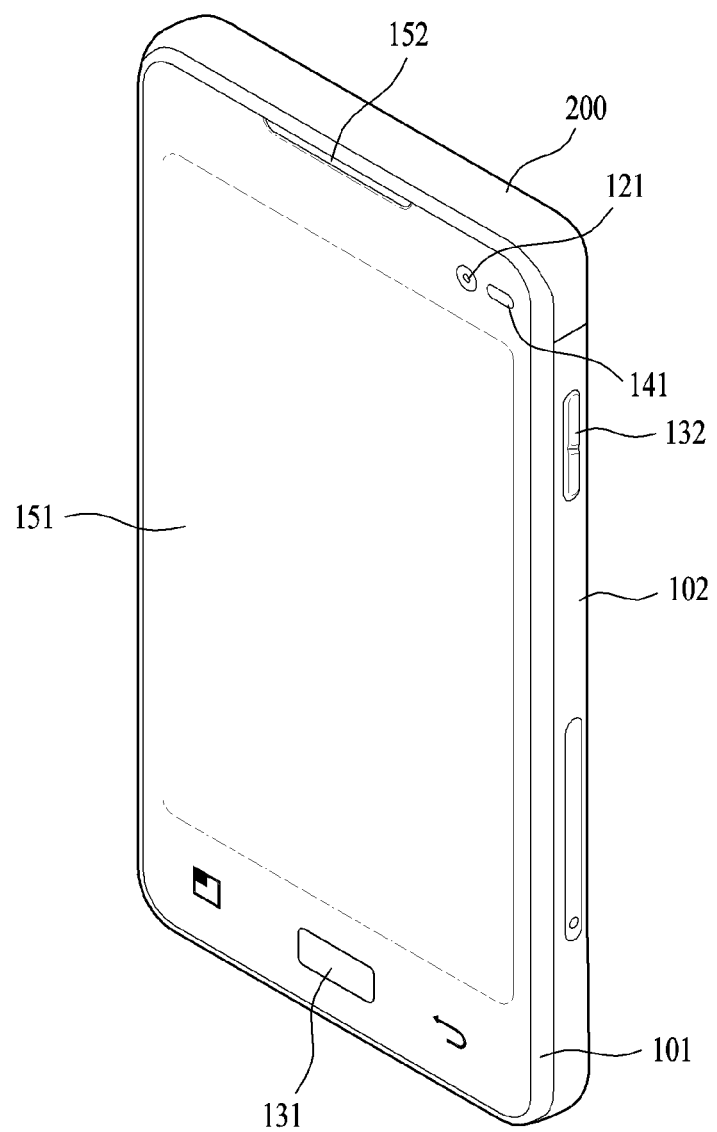
FIG. 2 is a front perspective diagram of the mobile terminal in accordance with one embodiment of the present disclosure.

Referring to FIGS. 1 and 2, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 may control the overall operations of the mobile terminal 100. For example, the controller 180 may performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Next, FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case 101, 102, 103 configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part such as a battery, a USIM card, a memory card and the like. In doing so, the rear case 102 may further include a backside cover 103 (see FIG. 3) configured to cover the surface of the rear case 102. In particular, the backside cover 103 has a detachable configuration for the user's convenience. If the backside cover 103 is detached from the rear case 102, the surface of the rear case 102 is exposed.

Figure 3:
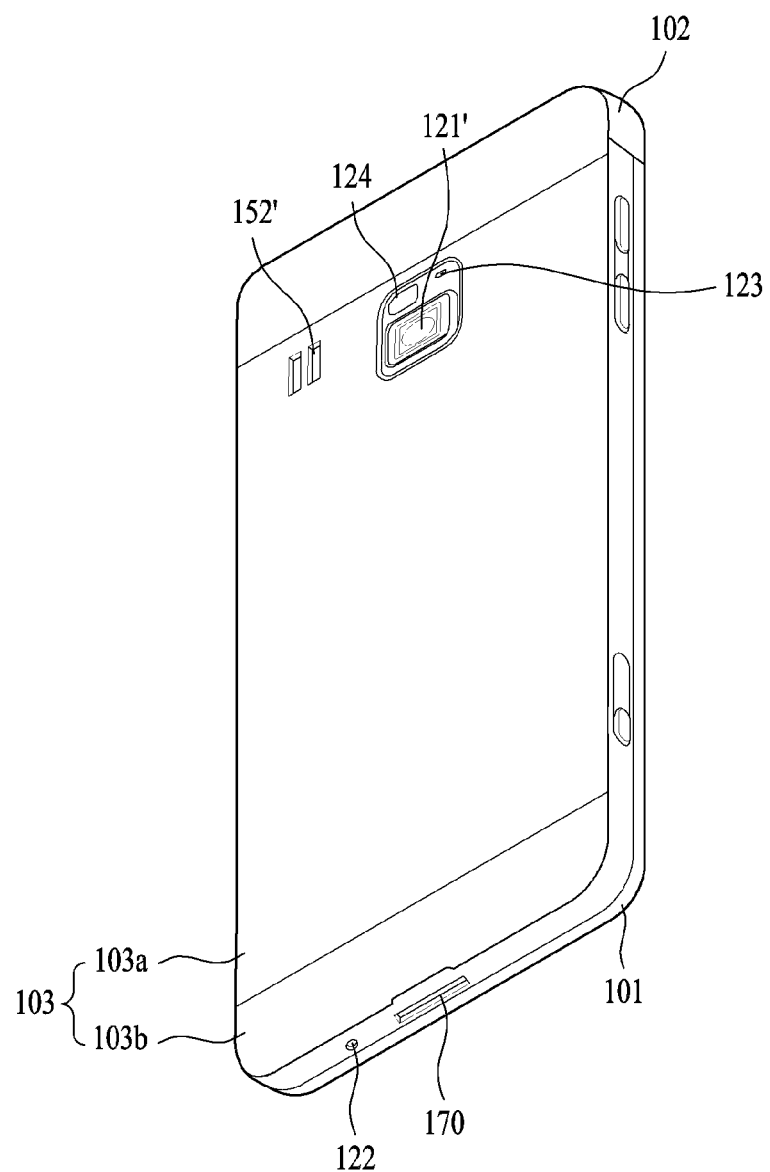
FIG. 3 is a rear perspective diagram of the mobile terminal in accordance with the embodiment of the present disclosure.

Referring to FIG. 3, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' (see FIG. 4) configured to expose a camera 121' or an audio output unit 152' externally.

The cases 101, 102 and 103 can be formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 170 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the third manipulating unit 133.

A button type is configured to recognize a pressure applied by a user to each of the manipulation units 131, 132 and 133. If a touch sensor is provided to each of the manipulation units 131, 132 and 133 in addition to the display unit 151, a user's command can be inputted by a user's touch. FIG. 3 is a perspective diagram of a backside of the terminal shown in FIG. 2.

Referring to FIG. 3, the camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

The additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

The case 102, 102 and 103 may partially include a metal part 103a. The metal part 103a is provided in a rear surface of the case. In case the battery 191 is detachable provided in the mobile terminal, the metal part 103a is provided in a detachable battery cover 103. In case the battery is integrally formed with the mobile terminal, the battery cover 103 is omitted and the metal part 103a may be provided in the rear case 102.

Figure 4:
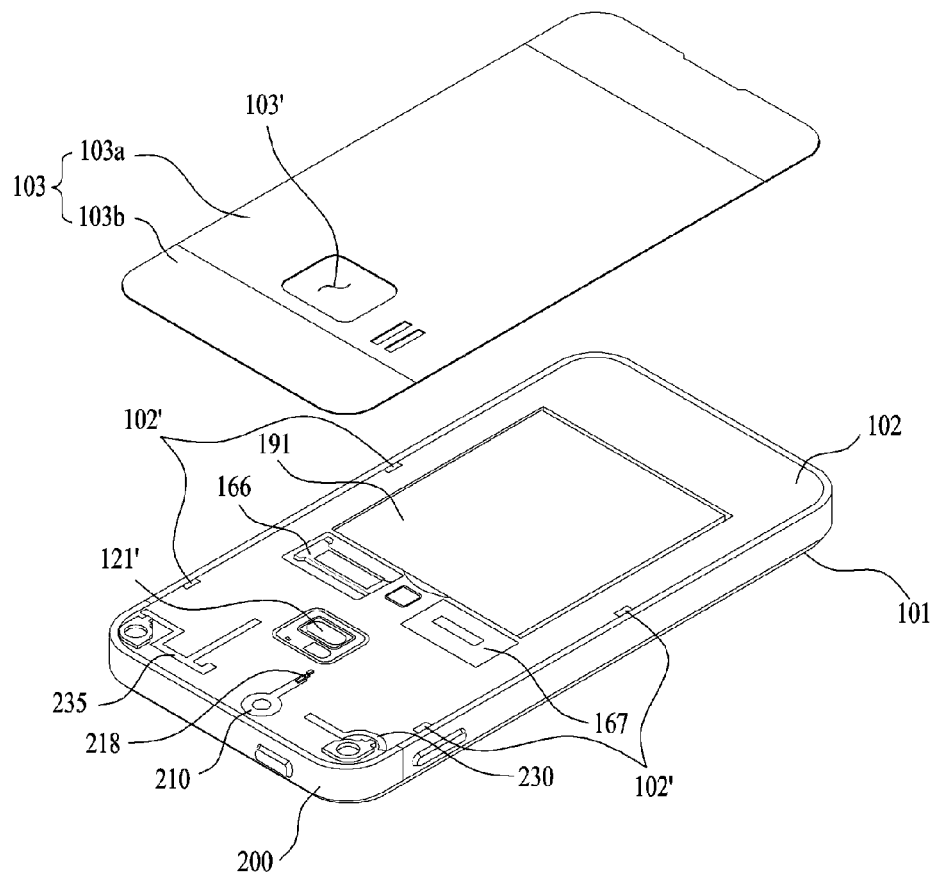
FIG. 4 is a perspective diagram illustrating a backside cover separated from a rear surface of the mobile terminal in accordance with the embodiment of present disclosure.

FIG. 4 is a perspective diagram of a mobile terminal according to one embodiment of the present invention, in which a surface of a rear case is shown by detaching a backside cover of the mobile terminal.

Referring to FIG. 4, a mobile terminal according to one embodiment of the present invention may include the front case 101, the rear case 102, the backside cover (or a battery cover) 103, the camera 121', the interface 170, the microphone 122, the audio output unit 152', a battery 191, a battery loading part, the USIM card loading part 166, a memory card loading part 167 and the like are shown.

That is, a space for receiving such an external component as the battery loading part, the USIM card loading part 166, the memory card loading part 167 and the like may be provided to a surface of the rear case 102. Generally, the external components mounted on the surface of the rear case 102 are provided to extend functions of the mobile terminal 100 to meet the user's demands for the diversified functions of the mobile terminal 100.

As the functions of the mobile terminal 100 are diversified, the battery 191 may be a replaceable type, as shown in FIG. 4, to supplement considerable power consumption of the mobile terminal 100. In case of the replaceable type battery, the battery loading part may be formed on the surface off the rear case 102. And in addition, a connecting terminal may be provided to the battery loading part to be connected with a component installed inside the case.

Referring to FIG. 4, the USIM card loading part 166 or the memory card loading part 167 may be provided next to the battery loading part. Alternatively, the USIM card loading part 166 or the memory card loading part 167 may be provided to a bottom surface of the battery loading part. In this configuration, if the battery 191 is separated from the battery loading part, the USIM card loading part 166 or the memory card loading part 167 may be externally exposed. Hence, the battery loading part may be enlarged to increase a size of the battery 191.

FIG. 4 shows that the USIM card loading part 166 or the memory card loading part 167 is provided a rear side of the rear case 102. Alternatively, the USIM card loading part 166 or the memory card loading part 167 may be provided a lateral side of the rear case 102 to enable a USIM card or a memory card to be loaded/unloaded via the lateral side of the rear case 102.

The backside cover 103 is configured to cover the surface of the rear case, thereby fixing the battery 191, the USIM card, the memory card and the like to the surface of the rear case 102. Hence, the battery 191, the USIM card, the memory card and the like are prevented from being separated from the rear case 102. Recently, as a waterproof function is added, the mobile terminal 100 may further include a waterproof structure (not shown in the drawing) configured to seal up the mobile terminal 100. Hence, when the rear case 102 and the backside cover 103 are assembled together, the external components can be protected against water.

A first antenna radiator 200 in accordance with the present disclosure is configured to reduce a distance with a metal part 103a of the backside cover 103. Upper and lower portions of the backside cover 103 may be formed of an injection mold 103b which is formed of a non-conductive material. A metal part 103a is arranged in a central portion of the backside cover 103.

The first antenna radiator 200 provided in one end of the mobile terminal may be provided in an upper end of the mobile terminal. However, it may be provided in a lower end of the mobile terminal Rather than the first antenna radiator 200, an additional antenna for communication, for example, Bluetooth or WiFi and GNSS communication may be further provided. Although not shown in the drawings, a mobile communication module 112 may be provided in the other end to transmit and receive a wireless signal to and from a base station on a communication network.

Figure 5:
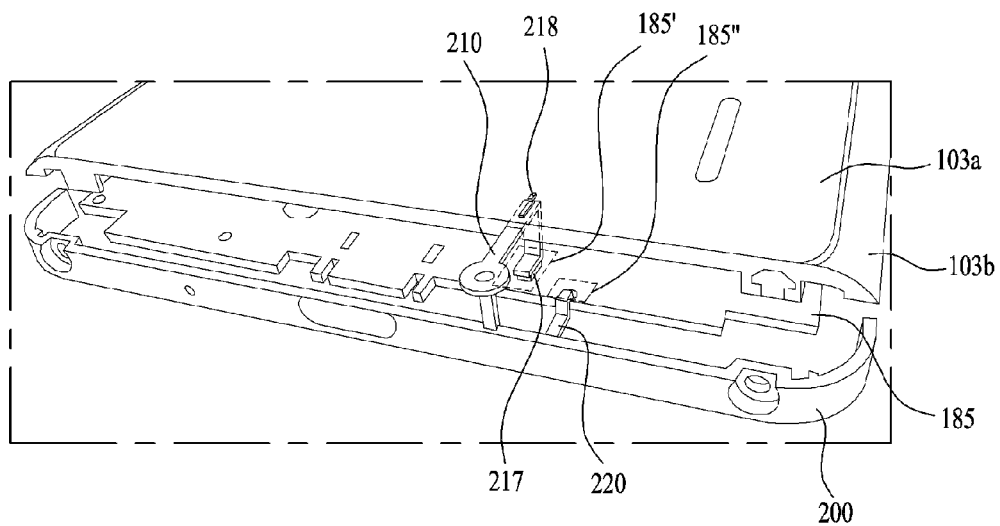
FIG. 5 is a conceptual diagram illustrating an antenna provided in an end of the mobile terminal in accordance with the embodiment of the mobile terminal.

FIG. 5 is a conceptual diagram illustrating an antenna provided in one end of the mobile terminal in accordance with the present disclosure. Referring to FIG. 5, the first antenna radiator 200 is connected to the main body 185 and a metal part 103a of the case 101, 102 and 103.

Various elements for generally controlling functions of the mobile terminal are loaded in the main board 185 and the main board 185 includes a power supply part provided with the electric power from a battery to supply the power to components of the mobile terminal and a ground surface 185'. The first antenna radiator 200 is connected to the power supply part 185" and the ground surface 185' of the main body 185. The power supply part 185" is configured to supply the electric power to the first antenna radiator 200 and the ground surface 185' is configured to ground the first antenna radiator 200 to the main board 185 there through.

The first antenna radiator 200 includes a power supply line 220 connected to the power supply part 185" of the main board 185 and a ground line 210 connected to the ground surface 185'. A route may be formed, having the power supply part 185", the power supply line 220, the first antenna radiator 200, the ground line 210 and the ground surface 185'. An electromagnetic field is formed by electric currents flowing along the route to facilitate transmission and reception of signals.

A frequency of a signal transmitted and received by the first antenna radiator 200 may be differentiated according to the length of the route. The length of the first antenna radiator 200 or the length of the ground line 210 or the power supply line 220 may be adjusted to be proper to a frequency of a signal to be transmitted and received.

As shown in FIG. 5, the power supply line 220 and the ground line 210 are arranged aside from a central portion of the first antenna radiator 200, to make different a frequency of a signal transmitted and received by a portion from a frequency of a signal transmitted and received by the other portion of the first antenna radiator 200. Accordingly, signals in two or more frequency bandwidths may be transmitted and received. In other words, the short portion receives a high frequency signal and the long portion receives a low frequency signal.

In the mobile terminal using the case having the metal part 103a, an electromagnetic field is blocked between the main board 185 and the metal part 103a, which interferes in formation of the electromagnetic field in the first antenna radiator 200 and deteriorate signal transmission and reception efficiency of the first antenna radiator 200.

Accordingly, the present disclosure may connect the ground line 210 not only to the ground surface 185' of the main board 185 but also to the metal part 103a of the case, to solve the disadvantage of such the blocked electromagnetic field.

Figure 6:
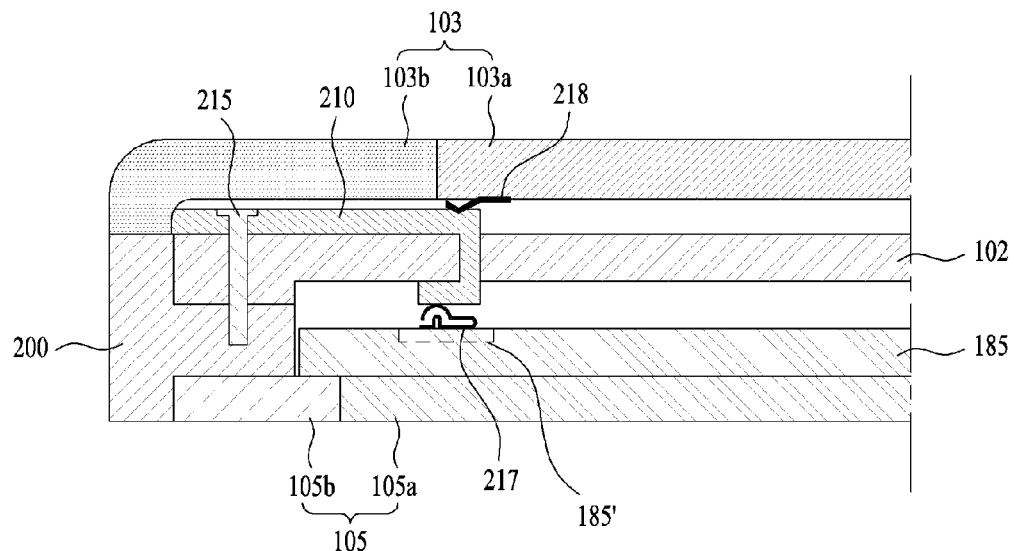
FIG. 6 is a sectional diagram illustrating grounding relation between a first antenna radiator and a metal part of a case provided in the mobile terminal in accordance with the embodiment of the present disclosure.
Figure 7:
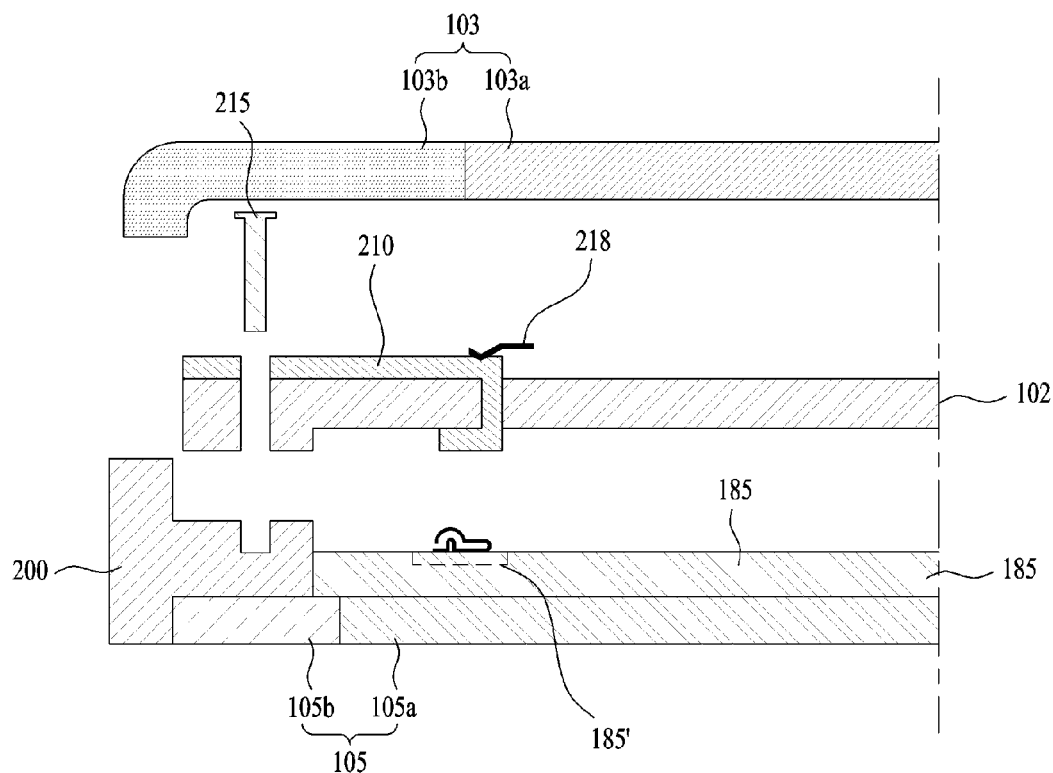
FIG. 7 is an exploded perspective diagram of FIG. 6.

FIG. 6 is a sectional diagram illustrating grounding relation between a first antenna radiator 200 and a metal part 103a of a case provided in the mobile terminal in accordance with the embodiment of the present disclosure. FIG. 7 is an exploded perspective diagram of FIG. 6. Referring to FIGS. 6 and 7, one end of the ground line 210 is connected to the first antenna radiator 200 and the other end is connected to the metal part 103a and the ground surface 185' of the main board 185. The ground line 210 is bent as shown in FIG. 6 and a flexible printed circuit board 210 having a conductive pattern formed therein may be used as the ground line 210. A predetermined portion of the flexible printed circuit board is provided in an outer surface of the rear case 102 and another predetermined portion is extended to an inside of the case via the case.

The one end of the printed circuit board 210 may be extended to the inside of the case to be connected to the first antenna radiator 200. A metallic screw 215 penetrates the flexible circuit board 210 and the rear case 102 for the connection with the first antenna radiator 200.

The other end of the ground line 210 is connected to both of the main board 185 and the metal part 103a of the backside cover 103. The main board 185 may include a flexible terminal 217 to be connected to the flexible printed circuit board 210, which is for assembling convenience.

After fabricated independently, the rear case 102 and the main board 185 are assembled as shown in FIG. 7. It is difficult to solder the rear case 102 and the main board 185 to each other. Accordingly, a terminal, for example, C-clip 217 having a flexible plate spring may be provided in the ground surface 185' to electrically connect the ground surface 185' to the ground line 210.

The terminal 217 may be provided and it is elastically flexible to connect the backside cover 103 and the ground line 210 to each other, to be connected to the metal part 103a. Once the backside cover 103 and the ground line 210 are connected inseparably, the backside cover 103 may not be separated from a body case (a rear case 102) to exchange a battery and then the connection terminal 218 is used. Examples of the connection terminal 218 may include a C-clip used for connection with the main board 185 and a finger clip.

When the backside cover 103 is coupled to the first antenna radiator 200, the backside cover 103 is connected to the ground line 210. When the backside cover 103 is decoupled, the backside cover 103 is separated from the ground line 210. Even when the backside cover 103 is decoupled, the first antenna radiator 200 may be connected to the ground surface 185' of the main board 185 via the ground line 210 and the performance of the antenna may be maintained.

When the backside cover 103 is coupled thereto, the first antenna radiator 200 in accordance with the present disclosure is grounded to the metal part 103a of the backside cover 103 and the ground surface 185' of the main board 185 simultaneously. When the backside cover 103 is decoupled therefrom, the first antenna radiator 200 is grounded only to the ground surface 185' of the main board 185.

Figure 8:
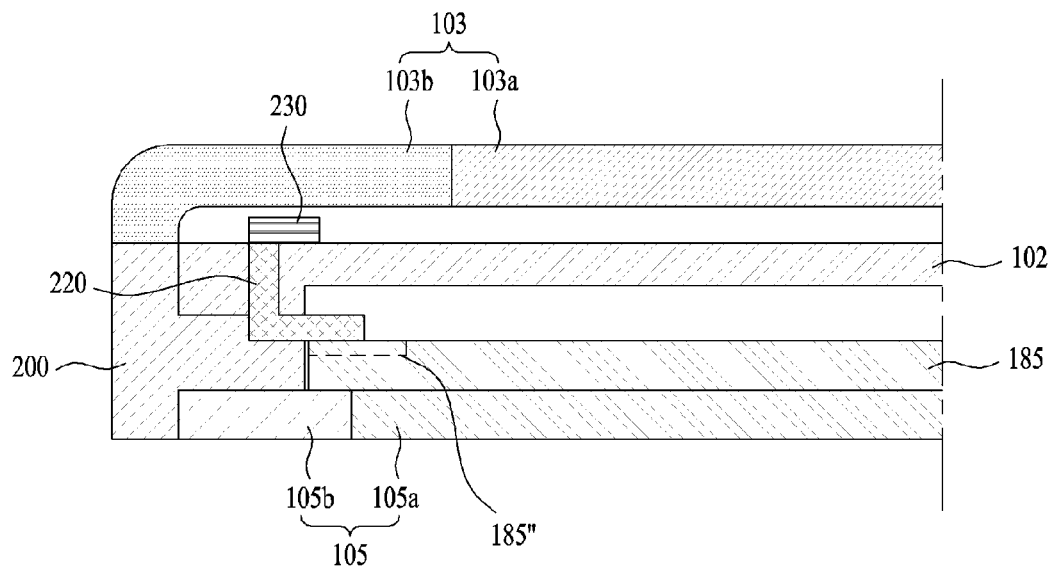
FIG. 8 is a sectional diagram of a portion where a power supply line for connecting the first antenna radiator and a power supply part of a main board with each other which are provided in the mobile terminal in accordance with the embodiment of the present disclosure.

FIG. 8 is a sectional diagram of a portion where the power supply line 220 for connecting the first antenna radiator 200 and the power supply part 185" of the main board 185 with each other which are provided in the mobile terminal in accordance with the embodiment of the present disclosure. the main board 185 provided with the power from the battery may apply the power to the first antenna radiator 200 and electric currents flow to the first antenna radiator 200.

Figure 9:
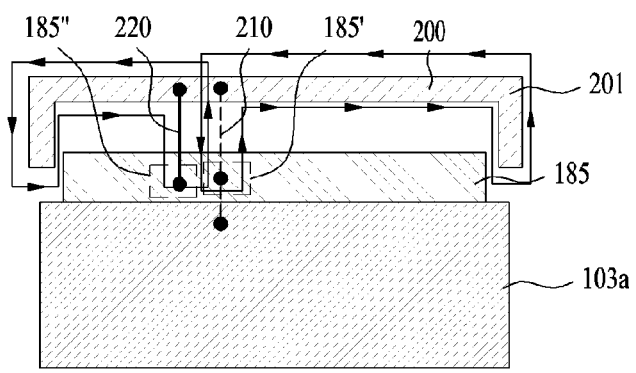
FIG. 9 is a conceptual diagram illustrating power supply and ground relation of the first antenna radiator provided in the mobile terminal in accordance with the present disclosure.

FIG. 9 is a conceptual diagram illustrating power supply and ground relation of the first antenna radiator 200 provided in the mobile terminal in accordance with the present disclosure. The first antenna radiator 200 is connected to the power supply part 185" of the main board 185 via the power supply line 220 and grounded to both of the ground surface 185' of the main board 185 and the metal part 103a of the backside cover 103 via the power supply line 210.

As shown in FIG. 9, the power supply line 220 and the ground line 210 are arranged in a portion aside from a central portion of the first antenna radiator 200. The portion of the first antenna radiator 200 receives a high frequency signal and the other portion receives a low frequency signal.

At this time, the function of the portion aside from the central portion, where the power supply line 220 and the ground line 210 are arranged, may be differentiated according to a position of a second antenna radiator provided in a lower end. To minimize interference of the second antenna radiator provided in the lower end of the mobile terminal, the connecting portion between the power supply line 220 and the ground line 210 of the first antenna radiator 200 may be provided in the same direction with the second antenna radiator.

In other words, when the power supply and ground of the second antenna radiator are provided in a right portion, the ground line 210 and the power supply line 220 of the first antenna radiator 200 are provided in a right portion. When the power supply and ground of the second antenna radiator are provided in a left portion, the ground line 210 and the power supply line 220 of the first antenna radiator 200 are also provided in the left portion. In case they are arranged in the same direction, the performance of the antenna for the low frequency signal may be enhanced.

The length of the route configured of the power supply line 220, the first antenna radiator 200 and the ground line 210 is associated with the frequency of the transmitted and received signal. The route may be partially bent as shown in FIG. 9 to be arranged to right and left sides of the mobile terminal according to the size of the mobile terminal. At this time, the route has to be spaced apart a preset distance from the metal part 103a of the backside cover 103, so that the size of the metal part 103a may be getting small.

Figure 10:
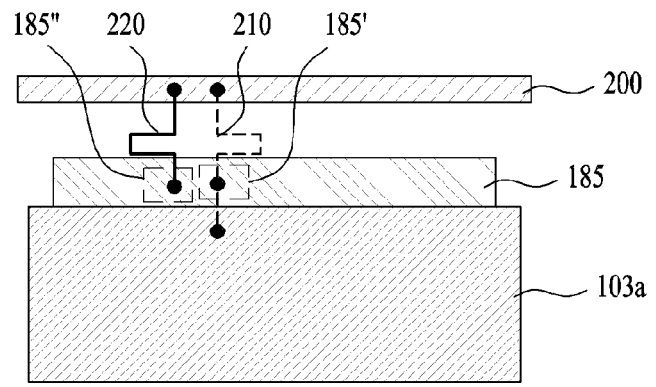
FIG. 10 is a conceptual diagram illustrating power supply and ground relation of a first antenna radiator provided in a mobile terminal in accordance with a second embodiment of the present disclosure.

As shown in FIG. 10, the bent end portion 201 (shown in FIG. 9) of the first antenna radiator 200 may be omitted and the first antenna radiator 200 may be formed linear. The length of the power supply line 200 or the ground line 210 may be increased as much as the reduced length of the first antenna radiator 200, so as to compensate the overall length of the route. When the bent portion of the first antenna radiator 200 is omitted, a sufficient distance between the first antenna radiator 200 and the metal part 103a can be secured. Accordingly, a degree of freedom in designing the case of the mobile terminal can be enhanced.

Figure 11:
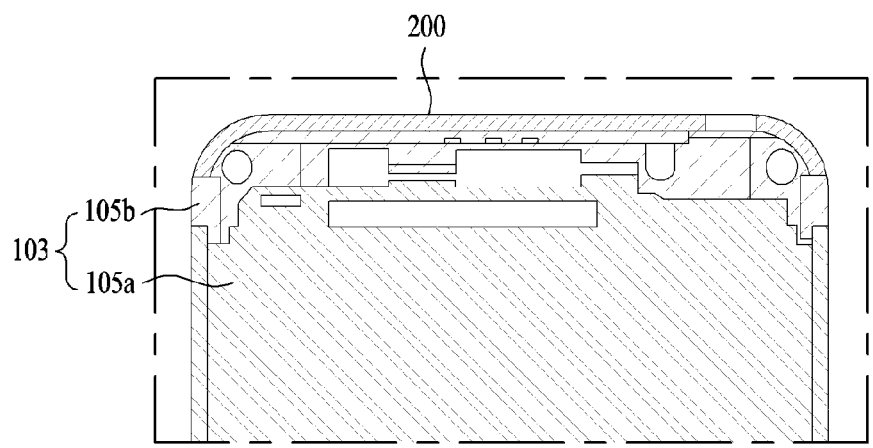
FIG. 11 is a plane view illustrating a middle frame of the mobile terminal in accordance with the embodiment of the present disclosure.

The first antenna radiator 200 shown in FIG. 11 may be integrally formed with a middle frame 105. The display unit 151 is loaded in a front surface of middle frame 105 and the main board 185 is loaded in a rear surface of the middle frame 105. The camera 121, the microphone 122, the audio output module 152 and other various parts are loaded in the middle frame 105. The middle frame 105 include a metal plate 105a to prevent damage to the display unit 151, while the rear surface thereof is supporting the display unit 151, or to ground the display unit 151.

It is difficult to form unevenness in the metal plate 105a to stably load various parts. The middle frame 105 further includes an injection mold 105b formed in the metal plate 105a through a double-molding process. The metal plate 105a is partially embedded and partially exposed outside as shown in FIG. 11. The injection mold 105b is provided in upper and lower portions of the middle frame 105. The first antenna radiator 200 is spaced apart a preset distance from the metal plate 105a by the injection mold 105b.

The metal plate 105a is formed of a metallic material so that resonance phenomenon may occur in the metal plate 105a and the metal part 103a. Four or more spots of the metal part 103a and the metal plate 105a are electrically connected (see 102 of FIG. 4), to eliminate the resonance phenomenon. The upper and lower portions of the metal plate 105a are covered with the injection mold 105b, so that right and left portions of the metal plate 105a may be electrically connected to the metal part 103a.

When the portion closer to the first antenna radiator 200 are electrically connected, the resonance phenomenon can be reduced more. In case the first antenna radiator 200 is provided in the upper portion of the mobile terminal 100, an upper edge portion of the metal part 103a may be connected to the metal plate 105a. A lateral surface of the body case 101 and 102 may partially expose the metal plate 105a or partially include a conductive material 102' electrically connected to the metal plate 105a.

Figure 12:
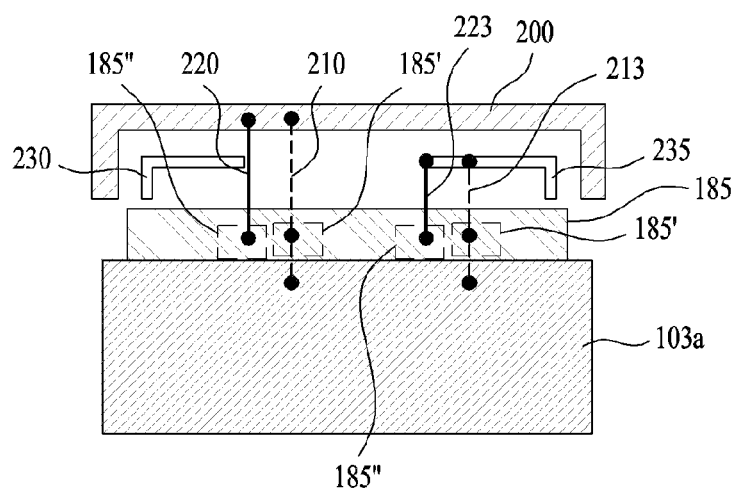
FIG. 12 is a conceptual diagram illustrating power supply and ground relation of a first antenna radiator provided in a mobile terminal in accordance with a third embodiment of the present disclosure.

As shown in FIG. 12, radiation patterns may be further provided for additional wireless communication, rather than the first antenna radiator 200. The radiation patterns 230 and 235 may be formed in a surface of the rear case 102. Specifically, the radiation patterns 230 and 235 may be formed between the first antenna radiator 200 and the metal part 103a of the backside cover 103, in other words, the portion covered with the non-metal part 103a of the backside cover 103 when the backside cover 103 is coupled to the rear case 102.

The radiation pattern 230 and 235 is connected to the power supply part 185" of the main board 185 to be supplied the power via supply line 220 and 223 and connectedly grounded to both of the ground surface 185' of the main board 185 and the metal part 103a of the backside cover 103 via ground line 210 and 213, similar to the first antenna radiator 200. One radiation pattern 235 provided in a right portion of FIG. 12 is grounded to the ground surface 185' of the main board 185 and the metal part 103a simultaneously, like the first antenna radiator 200 and it is grounded only to the main board 185, when the backside cover 103 is decoupled.

The other radiation pattern 230 provided in a left portion of FIG. 12 is connected to the power supply line 220 of the first antenna radiator 200. In other words, the other radiation pattern 230 is provided with the power via the power supply line 220 and an electromagnetic field is formed.

As the first antenna radiator 200, an antenna may be used which may wirelessly communicate in a manner of MRD (Mobile Receive Diversity) or MIMO (Multiple-Input Multiple-Output).

MRD is the communication technique which allows a mobile terminal to receive various frequencies for communication. MIMO is a wireless communication technique allows a base station and a terminal to use several antennas in transmitting and receiving data to enhance data transmission and reception.

The radiation pattern 230 connected to the power supply line 220 of the first antenna radiator 200 may be used in receiving a signal of GNSS (Global Navigation Satellite System). GNSS means a global navigation satellite system including GPS mentioned above and it is used in recognizing the location of the mobile terminal.

The other radiation pattern 235 additionally connected to the first antenna radiator 200 may transmit and receive a high frequency signal. The high frequency signal has a short range where the signal travels and it may be used for an antenna for short range communication, for example, WiFi and Bluetooth.

Figure 13:
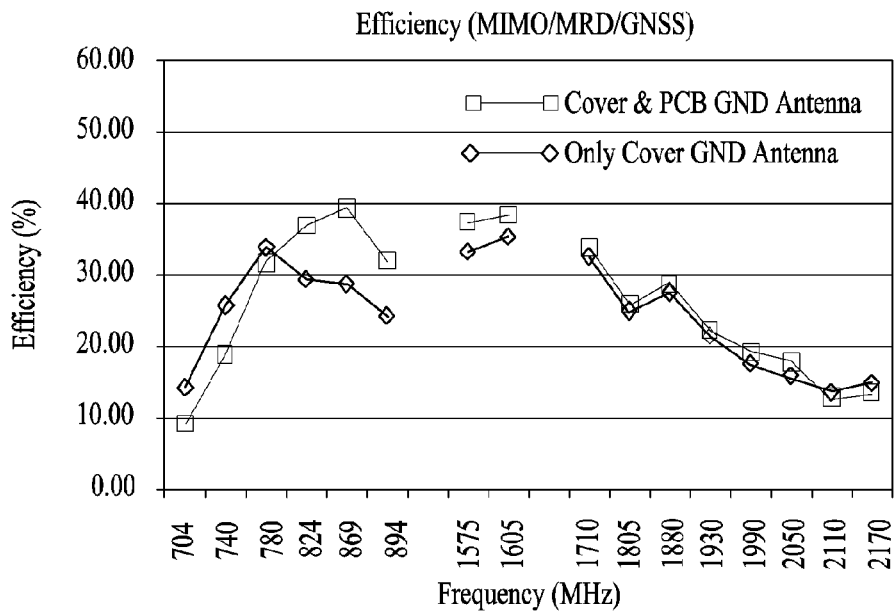
FIG. 13 is a graph illustrating the efficiency of the first antenna radiator provided in the mobile terminal in accordance with the embodiment of the present disclosure.

FIG. 13 is a graph illustrating the efficiency of the first antenna radiator 200 provided in the mobile terminal in accordance with the embodiment of the present disclosure. A thin line means a status where the first antenna radiator 200 is grounded to both of the metal part 103a of the backside cover 103 and the ground surface 185' of the main board 185. A thick line means a status where the first antenna radiator 200 is grounded only to the metal part 103a of the backside cover. In case the first antenna radiator 200 is grounded to both of them, the efficiency is enhanced in the low frequency pattern.

Figure 14:
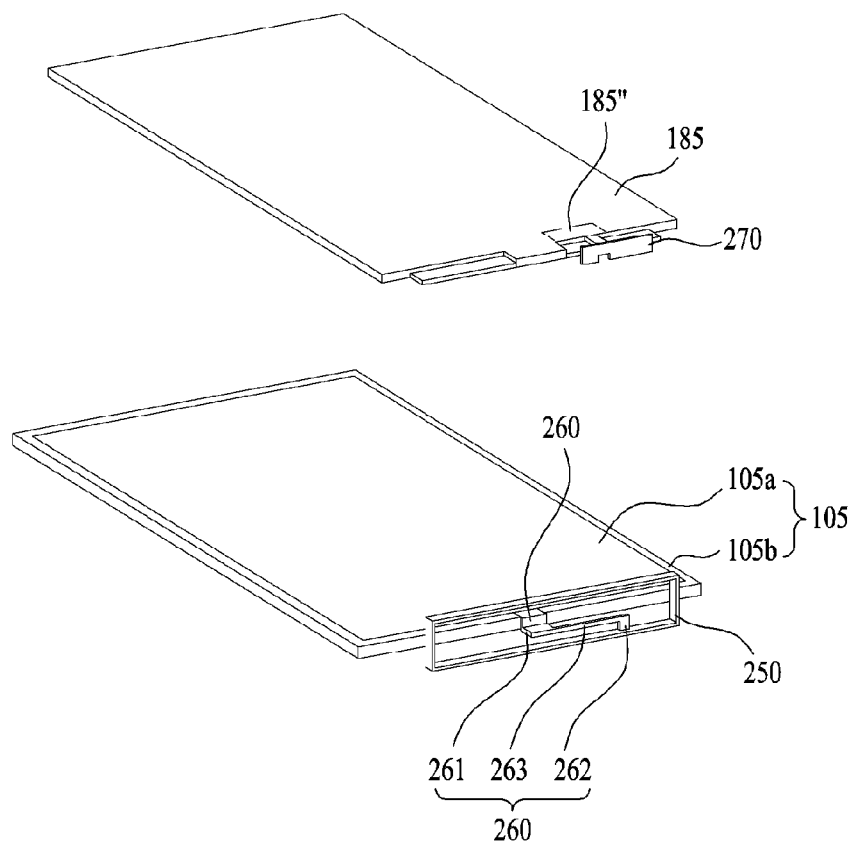
FIG. 14 is an exploded perspective diagram illustrating an antenna of the mobile terminal in accordance with the fourth embodiment of the present disclosure.
Figure 15:
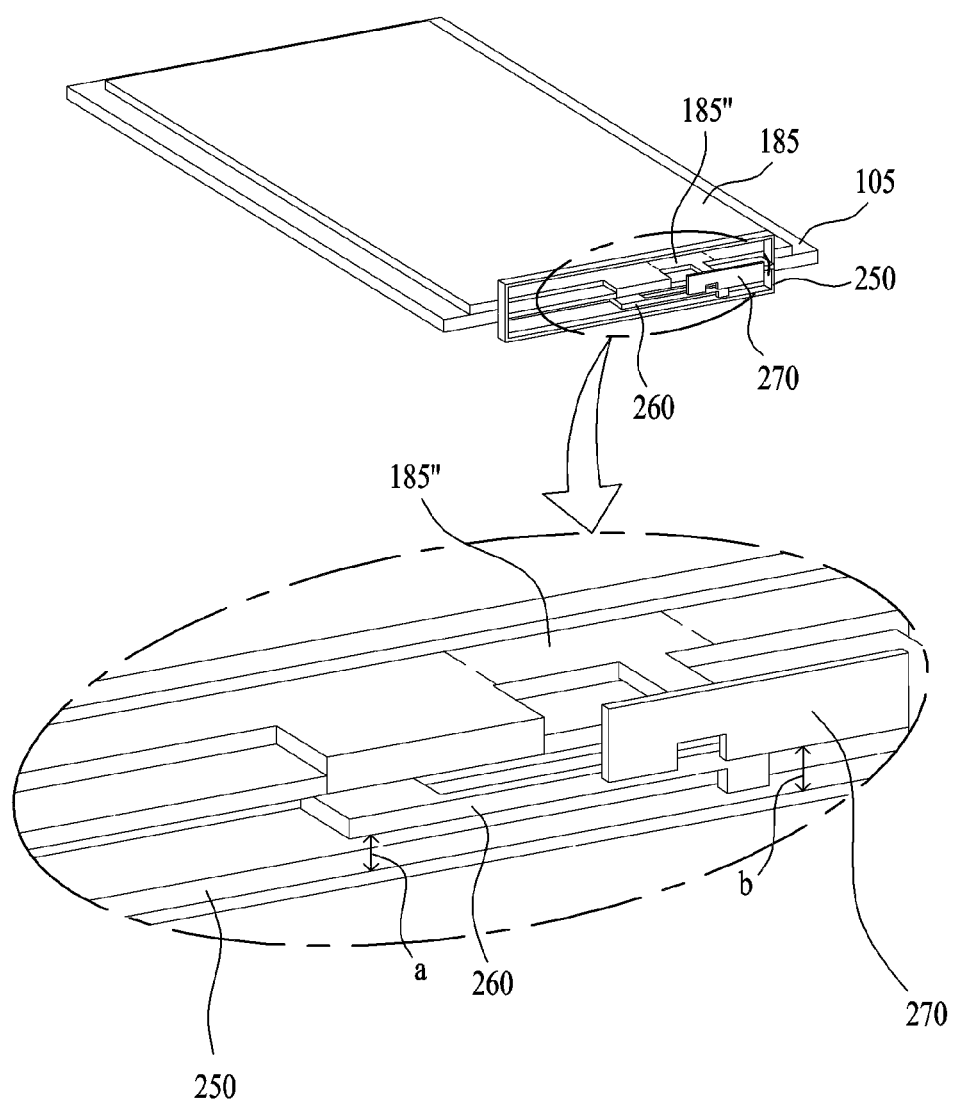
FIG. 15 is a perspective diagram illustrating a coupling process of FIG. 14.

FIG. 14 is an exploded perspective diagram illustrating a first antenna radiator 250, a main board 185 and a middle frame 105 provided in a mobile terminal in accordance with a fourth embodiment of the present disclosure. FIG. 15 is a perspective diagram illustrating a coupling status of FIG. 14. Referring to FIGS. 14 and 15, the antenna includes a loop-type first antenna radiator 250 and the first antenna radiator 250 is connected to the main board 185 and a ground surface via a power supply line 270 and a ground line 260.

The first antenna radiator 250 has a closed loop formed of a conductive material. In the drawing, the loop-type first antenna radiator 250 is rectangular-shaped. However, the shape of the first antenna radiator 250 may be variable, for example, overall. A frequency band width of transmitted and received signals may be variable according to the length formed by the loop of the first antenna radiator 250.

Various elements for generally controlling the functions of the mobile terminal are loaded in the main board 185 and the main board 186 is provided with the electric power from the lower supply unit 190 to supply the power to the components of the mobile terminal 100 (via a power supply part). The first antenna radiator 250 is connected to the power supply part 185" of the main board 185 via the power supply line 270.

The power supply line 270 connected to the power supply part 185" may be directly in contact with the first antenna radiator 250. Alternatively, as shown in FIG. 15, the power supply line 270 may be spaced apart a preset distance (b). Electricity could be stored between the power supply line 270 spaced apart a preset distance from the first antenna radiator 250, like a capacitor. The first antenna radiator 250. Once a preset amount of electricity is charged, electric currents can flow in the power supply line 270 like a connected circuit.

The middle frame 105 includes a metal plate 105a to prevent damage to the display unit 151, while the rear surface thereof is supporting the display unit 151, or to ground the display unit 151. It is difficult to form unevenness in the metal plate 105a to stably load various parts. The middle frame 105 further includes an injection mold 105b formed in the metal plate 105a through a double-molding process. The metal plate 105a is partially embedded and partially exposed outside.

The metal plate 105a may be employed as the ground surface and it may be connected to the first antenna radiator 250 via the ground line 260. Electric currents flow along a route configured of the ground line 260, the first antenna radiator 250 and the power supply line 270. An electromagnetic field is formed in the first antenna radiator 250 to transmit and receive a signal in a specific frequency bandwidth.

When transmitting and receiving a low frequency signal, the performance of the first antenna radiator 250 may be changeable according to the distance between the metal plate 105a and the first antenna radiator 250 disadvantageously. Because of such disadvantage, the ground line 260 may further include a by-pass line 263 to enhance transmission and reception efficiency of low frequency signals.

Referring to FIG. 14, the ground line 260 includes a ground portion 261 connected to the ground surface 105a, a radiator contact portion 262 connected to the first antenna radiator 250 and a bypass line 263 disposed between the ground portion 261 and the radiator contact portion 262, spaced apart a preset distance from the first antenna radiator 250. The ground portion 261 of the ground line 260 is connected to the ground surface 105a and the radiator contact portion 262 is connected to the first antenna radiator 250. In this instance, the by-pass line 263 shown in FIG. 15 is partially parallel to the first antenna radiation, spaced apart a preset distance from the first antenna radiator 250. The first antenna radiator 250 parallel to the bypass line 263 provides two passages. Electric currents flow along the two passages, respectively, to transmit and receive signals in different frequency bandwidth.

Figure 16:
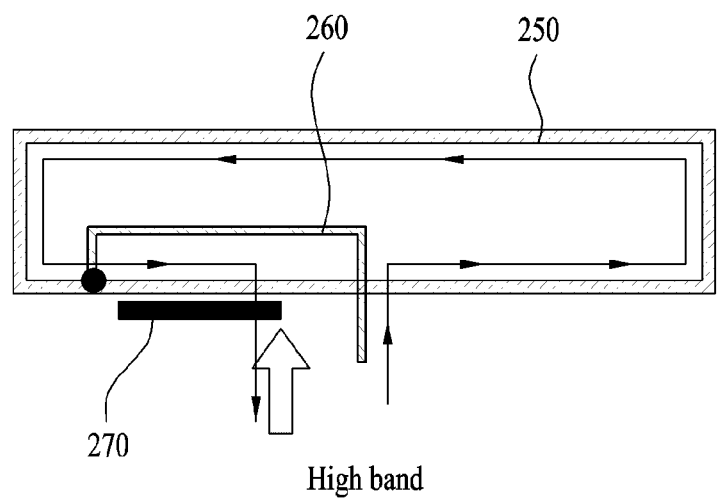
FIGS. 16 and 17 are diagrams illustrating an operational state of the mobile terminal in accordance with the present disclosure based on transmission/reception frequency of an antenna.
Figure 17:
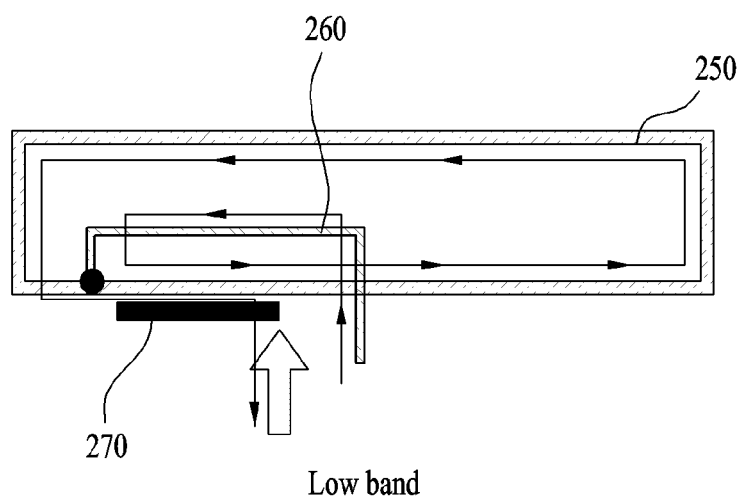

FIGS. 16 and 17 are diagrams illustrating an operational state of the mobile terminal in accordance with the present disclosure based on transmission/reception frequency of an antenna. FIG. 16 illustrates a route where electric currents for forming an electromagnetic field configured to transmit and receive a high frequency signal. FIG. 17 is a conceptual diagram illustrating flow of currents to form an electromagnetic field configured to transmit and receive a low frequency signal.

The route where currents are flowing has to be short, in case of a high frequency having a short wavelength. The route where currents are flowing has to be long, in case of a low frequency having a long wavelength.

As shown in FIG. 16, the currents for transmitting and receiving the high frequency signal pass through only the loop of the first antenna radiator 250 and form a short current route, not passing the by-pass line 263 of the ground line 260. The currents for transmitting and receiving the low frequency signal pass the by-pass line 263 of the ground line 260 and form a long route.

As the by-pass line 263 is provided, the transmission and reception efficiency of the low frequency signal may be improved and the distance between the metal plate 105a and the first antenna radiator 250 may be reduced. The distance with the metal plate 105a may be reduced and then the bezel formed in the upper or lower end of the mobile terminal can be reduced, so that the size of the mobile terminal can be reduced more.

Figure 18:
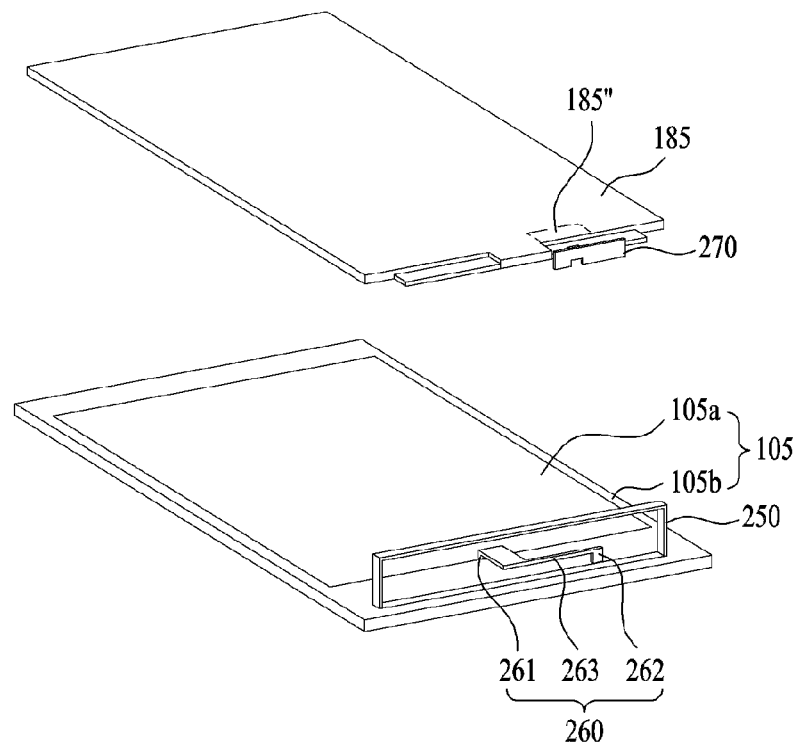
FIG. 18 is a perspective diagram illustrating an antenna of a mobile terminal in accordance with a fifth embodiment of the present disclosure.

FIG. 18 is a perspective diagram illustrating an antenna of the mobile terminal in accordance with the second embodiment of the present disclosure. In this embodiment, the first antenna radiator 250 may be integrally formed with the middle frame. A predetermined portion of the first antenna radiator 250 may be embedded in an injection molded portion of the middle frame 105.

Figure 19:
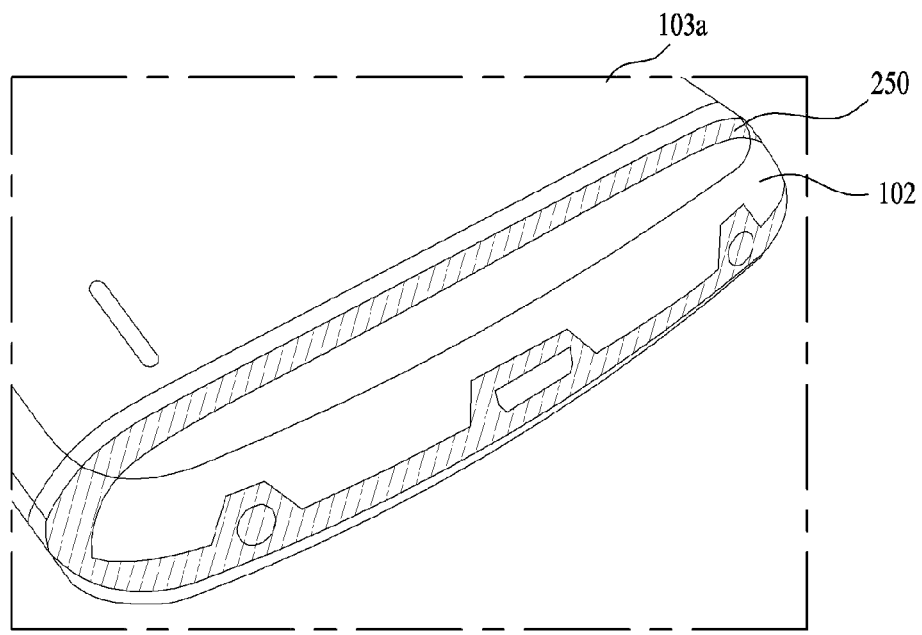
FIG. 19 is a perspective diagram illustrating an antenna of a mobile terminal in accordance with a sixth embodiment of the present disclosure.

FIG. 19 is a perspective diagram illustrating an antenna of a mobile terminal in accordance with a fifth embodiment of the present disclosure. In this embodiment, the first antenna radiator 250 may be arranged in the case. It may be formed in an inner surface of the case or exposedly formed in an outer surface of the case. In this instance, the first antenna radiator 250 may be grounded to the metal plate 105a of the middle frame 105 internally and supplied the power from the power supply part of the main board.

In case the rear case or the backside cover includes the metal part 103a, the first antenna radiator 250 may be grounded to the metal part 103a. Accordingly, even when the metal part 103a is close to the first antenna radiator 250, the performance of the antenna can be maintained. Alternatively, the first antenna radiator 250 may be grounded to an internal metal frame and the metal part 103a simultaneously. Even when the grounded state with the metal part 103a provided in the backside cover is not maintained after the first antenna radiator 250 is decoupled from the rear case, the grounded state with the metal plate 105a is maintained and there is not so big influence on the performance of the antenna.

Figure 20:
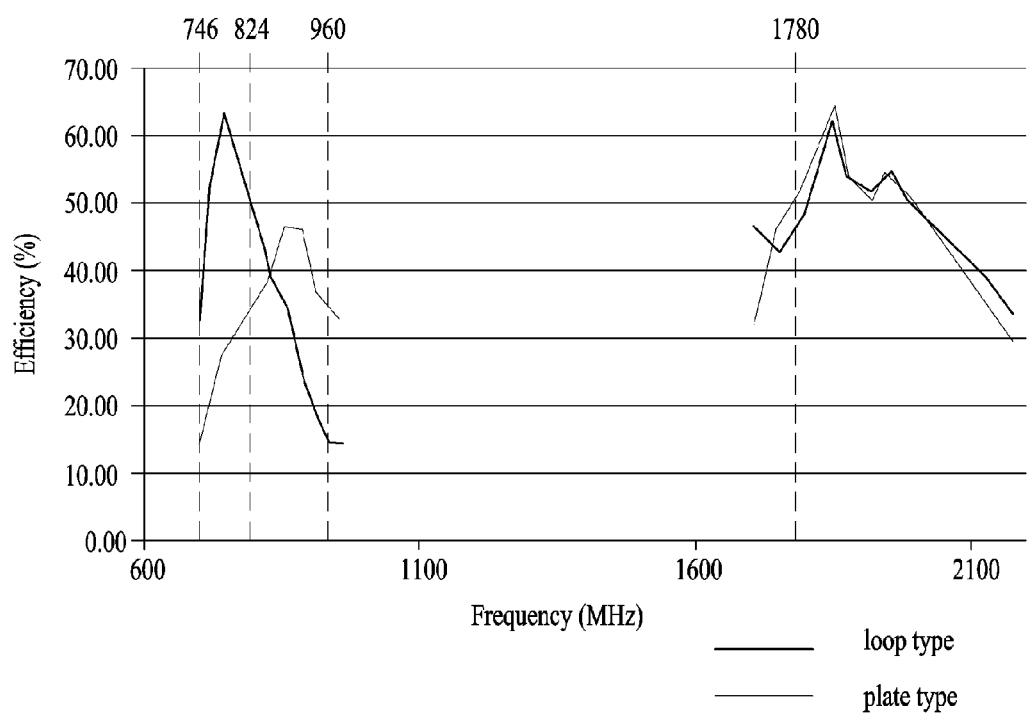
FIG. 20 is a graph illustrating the efficiency of the antenna provided in the mobile terminal in accordance with the fourth embodiment of the present disclosure.

FIG. 20 is a graph illustrating the efficiency of the antenna provided in the mobile terminal in accordance with the embodiment of the present disclosure. There is a difference between the efficiency of the antenna using a simple plate-type radiator and the efficiency of the antenna using the loop-type first antenna radiator.

Especially, the efficiency of the antenna using the loop-type first antenna radiator is higher than the efficiency of the antenna using the simple plate-type radiator in a low frequency bandwidth (746 MHz~960 MHz). In case of using the case having the metal part 103a, the reception efficiency is disadvantageously lowered in the low frequency bandwidth. When using the loop-type first antenna radiator 250, the reception efficiency may be enhanced.

In the embodiments of the present disclosure, the loop-type first antenna radiator 250 is used and it is partially spaced apart a predetermined distance from the lower supply line, to form the by-pass line 263. Accordingly, decrease of the signal transmission and reception efficiency in the low frequency bandwidth may be prevented.

As mentioned above, according to at least one of the embodiments of the present disclosure, the electromagnetic field formed between the metallic case and the main board 185 may be minimized even when a metallic material is sued for the case. Accordingly, the decrease of the antenna performance may be prevented.

Furthermore, the decrease of signal transmission and reception efficiency in the low frequency bandwidth may be prevented and the distance between the antenna radiator and the metal plate of the middle frame may be reduced. Accordingly, the size of the bezel may be reduced.

Still further, the case having the metal part may be used. When the first antenna radiator is directly grounded to the metal part of the case, the distance between the first antenna radiator 250 and the metal part of the case may be reduced. Accordingly, a degree of design freedom in using the metallic material for the case may be enhanced.

Still further, even in case the metallic material is decoupled in case of a battery cover having the metal case detachable there from, the performance of the antenna may be maintained.

When a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a case including a conductive metal part;
a main board mounted inside the case and having a power supply part and a ground surface;
a first antenna radiator spaced apart from the power supply part;
a power supply line for electrically connecting the power supply part to the first antenna radiator; and
a ground line for electrically connecting the ground surface to the metal part and the first antenna radiator,
wherein the ground line is a flexible circuit board comprising a conductive pattern having one portion connected to the first antenna radiator and the other portion connected to the metal part and the ground surface.

2. The mobile terminal of claim 1, wherein the case comprises;
a body case in which the main board is loaded; and
a backside cover detachably coupled to a rear surface of the body case and comprising the metal part.

3. The mobile terminal of claim 2, further comprising:
a screw connected to the first antenna radiator penetrating the flexible circuit board and the body case,
wherein the one portion of the flexible circuit board is provided in an outer surface of the body case.

4. The mobile terminal of claim 2, further comprising:
a connection terminal connected to the conductive pattern, the connection terminal elastically flexible to be connected to the metal part when coupled to the body case.

5. The mobile terminal of claim 1, wherein the first antenna radiator is exposed to an outer surface of the case to form a predetermined portion of the case.

6. The mobile terminal of claim 1, wherein the ground line and the power supply line are connected at a predetermined portion of the first antenna radiator, the predetermined portion positioned aside from a central portion of the first antenna radiator.

7. The mobile terminal of claim 6, wherein:
the first antenna radiator receives a first frequency signal and a second frequency signal, and
a ratio of a distance to one end of the first antenna radiator to a distance to the other end of the first antenna radiator from the predetermined portion corresponds to a ratio of a first frequency of the first frequency signal to a second frequency of the second frequency signal.

8. The mobile terminal of claim 6, further comprising:
a second antenna radiator provided in a predetermined portion of a second lateral surface not adjacent to a first lateral surface,
wherein the first antenna radiator is provided in the first lateral surface of four lateral surfaces formed in the mobile terminal, and
power supply and ground of the second antenna radiator is arranged aside to a predetermined portion in the same direction with the ground line and the power supply line.

9. The mobile terminal of claim 1, wherein each of the ground line and the power supply line has a bent portion, and
wherein the first antenna radiator is formed in a linear-bar shape.

10. The mobile terminal of claim 9, wherein:
a first distance between the bent portion of the ground line and the first antenna radiator and a second distance between the bent portion of the power supply line and the first antenna radiator are equal; and
a third distance between the bent portion of the ground line and the metal part and a fourth distance between the bent portion of the power supply line and the metal part are equal.

11. The mobile terminal of claim 1, wherein the first antenna radiator is provided in an upper or lower end of the mobile terminal, and
wherein the first antenna radiator is formed in a ⊏ shape extended from both end of the upper end of the mobile terminal in vertical direction.

12. The mobile terminal of claim 1, further comprising:
a radiation pattern provided between the metal part and the first antenna radiator and formed in a surface of the case, with electrically connected to the metal part.

13. The mobile terminal of claim 1, further comprising:
a middle frame provided inside the case, in which the main board and electronic components are loaded, the middle frame comprising a metal plate and an injection mold,
wherein the first antenna radiator is coupled to one end of the middle frame, spaced apart a preset distance from the metal plate, and
wherein the metal part is electrically connected to the metal plate.

14. The mobile terminal of claim 1, wherein the first antenna radiator is spaced apart from the metal part.

15. The mobile terminal of claim 14, wherein the first antenna radiator is spaced apart from the ground surface.

* * * * *